United States Patent [19]
Romiti et al.

[11] Patent Number: 5,784,369
[45] Date of Patent: Jul. 21, 1998

[54] METHODS AND SYSTEM FOR SWITCHING TIME-DIVISION-MULTIPLEXED DIGITAL SIGNALS OF DIFFERENT RATES

[75] Inventors: Stefano Romiti, Rome, Italy; Karl Ake Kristoffersson, Stockholm, Sweden

[73] Assignee: Telefonaktiebolaget LM Ericsson, Stockholm, Sweden

[21] Appl. No.: 592,707

[22] Filed: Jan. 26, 1996

[51] Int. Cl.⁶ .............................. H04Q 11/04; H04J 3/22
[52] U.S. Cl. ........................... 370/358; 370/379; 370/382
[58] Field of Search ................................. 370/358, 360, 370/363, 369, 370, 371, 376, 378, 379, 381, 382

[56] References Cited

U.S. PATENT DOCUMENTS

| | | | |
|---|---|---|---|
| 4,206,322 | 6/1980 | Lurtz | 370/358 |
| 4,485,468 | 11/1984 | Slana | 369/177 |
| 4,547,877 | 10/1985 | Lehman et al. | 370/381 |
| 4,718,058 | 1/1988 | van Vugt | 370/358 |
| 4,811,335 | 3/1989 | van Baardwijk et al. | 370/371 |
| 4,841,522 | 6/1989 | Yamazaki | 370/368 |
| 4,965,787 | 10/1990 | Almond et al. | 370/466 |
| 4,987,570 | 1/1991 | Almond et al. | 370/540 |
| 5,040,170 | 8/1991 | Upp et al. | 370/358 |
| 5,157,656 | 10/1992 | Turudic et al. | 370/379 |
| 5,287,350 | 2/1994 | Ito et al. | 370/379 |
| 5,351,236 | 9/1994 | Pawelski | 370/358 |
| 5,420,854 | 5/1995 | Hiraiwa | 370/359 |
| 5,420,863 | 5/1995 | Taketsugu et al. | 370/337 |
| 5,453,985 | 9/1995 | Ghisler | 370/358 |
| 5,467,353 | 11/1995 | Fukuda | 370/524 |

FOREIGN PATENT DOCUMENTS

| | | |
|---|---|---|
| 0 155 025 A1 | 9/1985 | European Pat. Off. . |
| 0 427 689 A1 | 5/1991 | European Pat. Off. . |
| 0 483 516 A2 | 5/1992 | European Pat. Off. . |

OTHER PUBLICATIONS

*Japan Telecommunications Review*, vol. 30, No. 3, Jul. 1988, Tokyo, Japan, pp. 42–50, M. Tokunaga, "Advanced Multimedia Time Division Multiplexer".

*Primary Examiner*—Hassan Kizou
*Attorney, Agent, or Firm*—Nixon & Vanderhye P.C.

[57] ABSTRACT

A digital telecommunications switching system includes a main normal rate switch having multiple, bi-directional ports for selectively switching timeslot associated with normal rate channels multiplexed on incoming and outgoing digital links. Each timeslot in the frame includes a predetermined number of bits. The normal rate switch switches timeslots received from any one of the switch ports to any one of the other switch ports at the normal rate. An "add-on" subrate switch is modularly connected to the normal rate switch and selectively switches one or more bits corresponding to one or more subrate channels within a timeslot at a data transmission rate which is less than the normal rate.

27 Claims, 12 Drawing Sheets

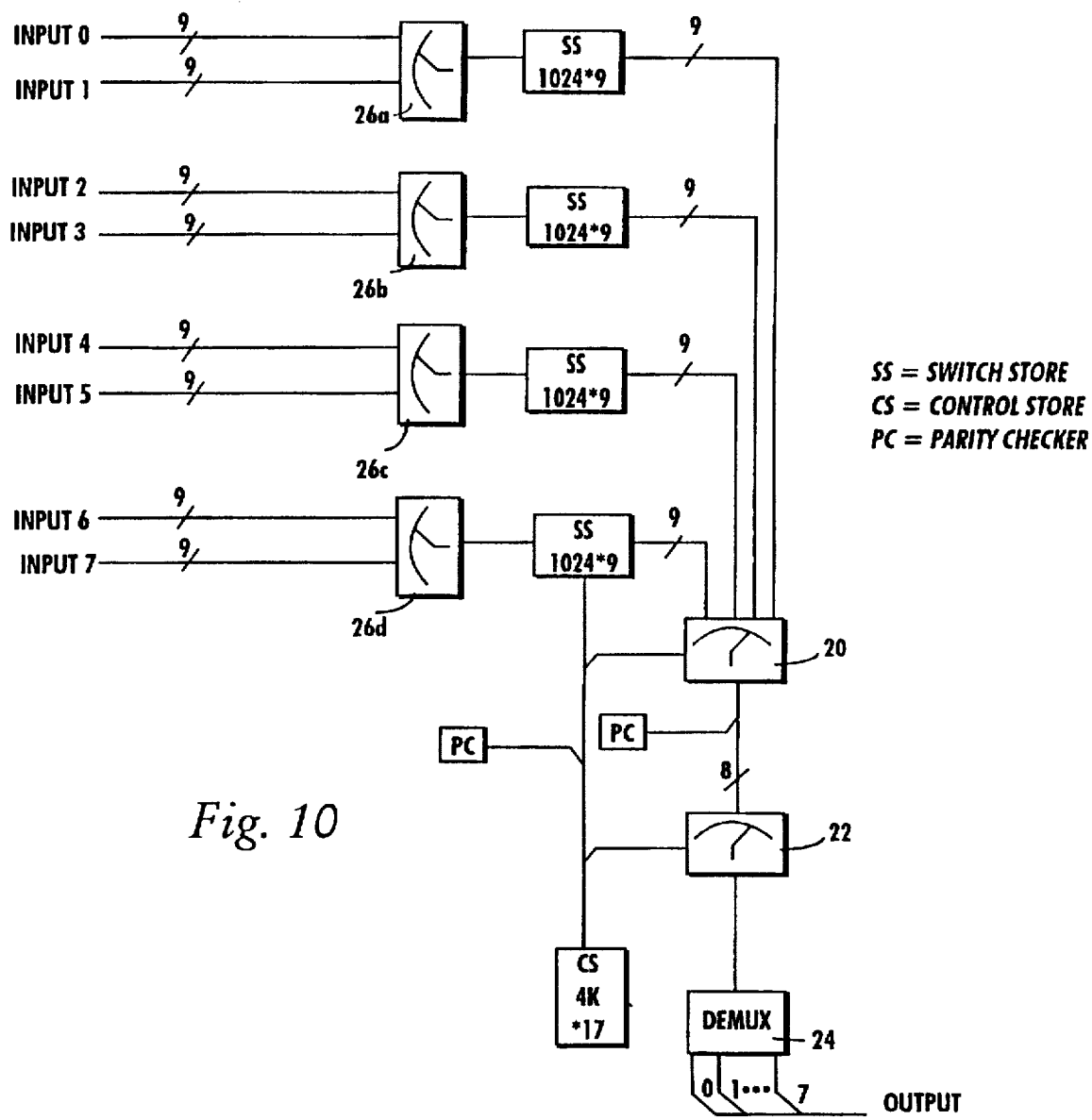
*Fig. 10*
*Fig. 11*
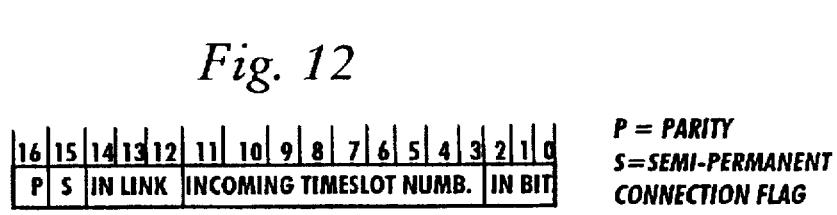
*Fig. 12*

METHODS AND SYSTEM FOR SWITCHING TIME-DIVISION-MULTIPLEXED DIGITAL SIGNALS OF DIFFERENT RATES

FIELD OF THE INVENTION

This invention relates to an apparatus for switching time-multiplexed digital signals, and more specifically, for switching time-division-multiplexed digital signals at different bit rates.

BACKGROUND AND SUMMARY OF THE INVENTION

Demands for digital telecommunications services are becoming increasingly diverse. In order to meet these diverse demands, it is desirable to adapt existing telecommunications transmission and switching facilities, some of which were first designed for digital communication based on 64 kb/s channels, so they may now handle transmission of channels at different bit rates. Digitized voice signals are typically transmitted at the basic rate (normal rate) of 64 kilobits per second (kbps) corresponding to a sampling rate of 8 kHz and an allocation of eight bits per PCM-coded sample. A number of normal rate channels are time-division-multiplexed in a digital signal, where an eight bit sample of one channel occupies one time slot in the frame of the signal. This means that samples on a normal rate "channel" are switched 8,000 times per second (8×8,000=64,000). However, not every telecommunications application transmits digital information at this rate. For example, data sources and destinations as well as mobile telephony voice channels can utilize lower bit rate channels, e.g., 16 kbps, often referred to as "subrate" channels. Thus, there is a need for existing telecommunications facilities to handle normal rate digitized voice channels (defined for purposes of description and not limitation as a channel with a bandwidth equal to 64 kbps) as well as subrate channels (defined as a channel with a bandwidth equal to something less than a normal rate 64 kbps channel, e.g., 8 kbps, 16 kbps, 24 kbps ... etc.)

Traditional approaches to handle normal rate and subrate channels have relied upon developing new and ever more complicated digital switching designs. In addition to increased complexity and cost, these approaches also do not utilize the existing switching infrastructure which is acceptable for many normal rate transmission and switching applications. Another approach to accommodate subrate information is to construct a "superframe" that contains multiple sub-frames. In U.S. Pat. No. 4,547,877, for example, in order to accommodate a lowest bit rate 2.4 kbps subrate channel, a superframe presented to a switching module contains timeslots of 20 frames with 23 channels per frame. In that instance, a superframe ends up consisting of 18,400 timeslots. In addition to the added complexity of a superframe, another significant drawback of subrate switching techniques that multiplex subrate channels onto superframes is that each subrate channel is mapped into one or more 8-bit timeslots of the superframe. As a result, an entire 8-bit byte of information must be switched rather than switching only the individual bits (less than a byte) that make up the subrate channel. Considerable delay is added by having to build a byte from the individual subrate channel bits. The superframe subrate switching system in the U.S. Pat. No. 4,547,877 also requires an elaborate synchronization scheme as well as special bits allocated within the superframe as subrate "signatures" in order to facilitate subrate switching within the superframe.

What is needed is a subrate switch which can be implemented and function cooperatively with existing switching technology but which also permits efficient subrate switching of individual subrate channels. Such subrate switching using existing switching infrastructures should not require elaborate protocols that rely on "superframes" and specialized subrate switching bits. A subrate switch should efficiently switch individual bits within a timeslot rather than having to switch the entire timeslot itself. In other words, subrate channels which have been multiplexed into a timeslot should be readily switched to separate destinations rather than having to route those subrate channels all to the same destination. However, such a subrate switch should not have to also handle switching normal rate channels. Instead, it is desirable that both a normal rate switch and a subrate switch be used to provide efficient switching of both normal and subrate channels.

It is therefore an object of the invention to provide an efficient and economical subrate switching system which can be adapted for use with existing telecommunications switching infrastructure as well as newly developing telecommunications technology.

It is an object of the present invention to provide a modular, "add-on" subrate switch which can be modularly added to a normal rate telecommunications switch to handle subrate switching of subrate channels multiplexed onto normal rate channels.

It is an object of the present invention to provide a modular, add-on subrate switch where several subrate channels can share a normal rate channel path through a normal rate digital switch but which can be switched independently of each other to different destinations via the add-on subrate switch.

It is also an object of the present invention to provide a new subrate switch architecture which meets the above objects using a relatively simple and effective subrate switching architecture. More specifically, it is an object of the present invention to provide a subrate switch architecture that includes switching in both time and in space using an array of switch stores where a single byte and a single bit within the byte can be selected from the switch stores using a single control address to achieve subrate switching at a bit level.

It is an object of the present invention to provide efficient and effective subrate switching without requiring elaborate "superframes," special subrate bit fields, or the delays associated with multiplexing subrate channels onto a superframe.

These objects and other objects are achieved by the digital telecommunications switching system of the present invention. A main normal rate switch having multiple, bidirectional ports for selectively switching normal rate channels multiplexed on incoming and outgoing time-slotted digital lines. A timeslot includes a predetermined number of bits, e.g., 8 bits. The main normal rate switch switches timeslots received from any one of the switch ports to any other switch port. An "add-on" subrate switch connected to the normal rate switch selectively switches one or more bits (corresponding to one or more subrate channels) within a timeslot at a data transmission rate which is less than the normal rate.

Multiple, slower data rate channels are time division multiplexed within the digital signal, i.e., subrate channels. The samples of one subrate channel can be made using bits 0, 1, 2, ... 7; and samples of several subrate channels can share the same timeslot (in different bit positions) of the frame. The normal rate switch routes those timeslots having subrate information to be switched to the subrate switch, and the subrate switch appropriately connects each individual subrate channel to its appropriate destination. The timeslots having subrate information generated at output ports of the subrate switch are returned to the normal rate switch for further transmission. In one embodiment, the normal transmission rate is 64 kbps and the subrate transmissions may include 8, 16, 32, 40, 48, and 56 kbps.

The subrate switch is designed for optimal switching of subrate channels, and in one example embodiment, selectively switches subrate channels in time and in space. Because of its modular structure, the subrate switch can be added on to existing normal rate switches of varying architectures. For example, the subrate switch can be modularly added to a time-space-time (TST) normal rate switch that includes a plurality of time switching modules and space switching modules as well as to strictly non-blocking time-space (TS) configured switches.

The subrate switch preferably includes a matrix of data memories for storing timeslot data. Samples coming from one input switch port are written in data memories of a row of the matrix. Therefore, all data memories in a row contain the same data. Multiplexers select a timeslot in one of the data memories in a column of the matrix as well as one or more individual bits in the selected timeslot. In this way, one or more individual bits in each timeslot can be selectively switched through the variable rate switch. A plurality of control memories are provided with each control memory corresponding to one of the columns of data memories in the matrix. Each control memory addressably selects one bit of one timeslot from one of the data memories in the column to generate a single output bit such that m output bits (where m is the number of bits in the timeslot) addressed from control memories are combined into an output timeslot and returned to the normal rate switch. Given that all the data memories in a row contain the same data, a group of n data memories may be replaced in other embodiments by one data memory that is written once and read n times in one timeslot cycle. The value of n depends on the access time to a location in the data memory. In this case, control memories for addressably selecting and reading out n individual bits from the column of data memories can be replaced by a single control memory with a number of locations that is n times that in a control memory controlling a single bit and is read n times in one timeslot cycle.

The present invention also provides for an advantageous method for switching different rate digital telephony channels. Normal rate demands received by a normal rate telecommunications switch between any one of multiple incoming and outgoing digital links by way of bi-directional switch ports are switched at a first switching rate. However, the normal rate switch routes timeslot having subrate information to a dedicated, modular subrate telecommunications switch or switch extension. Subrate channels are switched in the subrate switch at switching rates which are slower than the first switching rate and then returned to the normal rate switch.

Each request for a switching connection between two channels reports if the channels support the first or second rate. For first (normal) rate channel, the switching path is established through the normal rate switch independent of the subrate switch. For a second (sub) rate channel, a switching path is established through both the normal rate and subrate switches. Thus, three basic connections are established to switch a subrate channel. First, an incoming normal rate channel connection is established in the normal rate switch to link the timeslot containing the incoming subrate channel to the subrate switch. Second, an outgoing normal rate channel connection is established in the normal rate switch to link the timeslot containing the subrate channel outgoing from the subrate switch to the outgoing channel. Third, a second rate channel connection is established in the subrate switch. Thereafter, the second rate channel connection is connected to the incoming and outgoing first rate channel connection. Alternatively, semi-permanent connections may be established between the normal rate switch and the subrate switch timeslots for carrying subrate channels. In this way, only one connection need be established on demand because the two semi-permanent connections between the subrate switch and the normal rate switch are already established.

These and other objects and advantages of the present invention will be more fully described and better understood from the following detailed description when read in conjunction with the drawings.

BRIEF DESCRIPTION OF THE PREFERRED DRAWINGS

FIG. 10 is function block diagram illustrating a logical structure of the subrate switch architecture in accordance with still another embodiment of the present invention;

FIG. 11 illustrates the format of a control store address;

FIG. 12 illustrates the data format for each control store memory location;

DETAILED DESCRIPTION OF THE PREFERRED EMBODIMENTS

In the following description, for purposes of explanation and not limitation, specific details are set forth, such as particular circuits, interfaces, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 1:
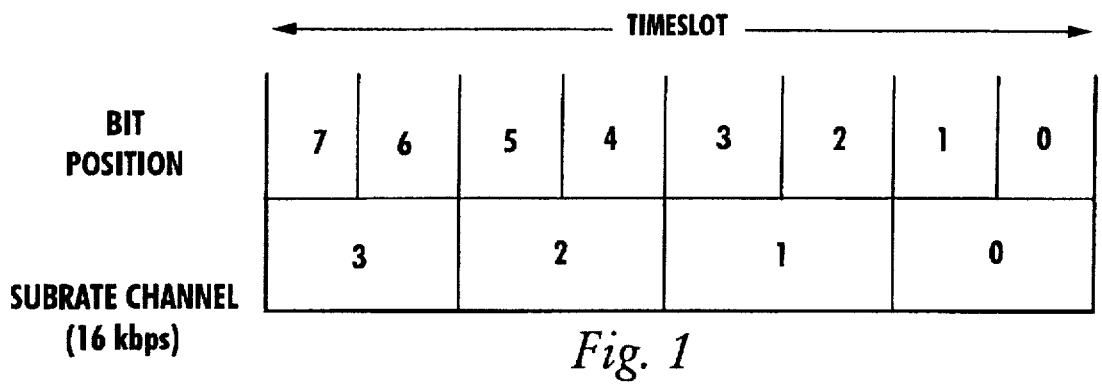
FIG. 1 is a diagram of an eight bit timeslot illustrating how four 16 kbps subchannels are packed into the timeslot.

Reference is made to FIG. 1 which shows how subrate channels are "packed" into timeslots. Specifically, single, normal rate, channels (e.g., at a rate of 64 kbps) are packed into 8-bits (0–7) timeslots in the frame. Four subchannels (0–3) are packed into one timeslot which are transmitted at one-fourth of the normal rate in this example—16 kbps. Some telecommunications equipment use both normal rate and subrate channels. In a European GSM network for mobile telephony systems, for example, a base station transceiver is connected to the base station controller with 2 Mbps PCM links, each link containing six 64 kbps signalling channels and forty-eight 16 kbps traffic channels. Those skilled in the art will of course appreciate that other examples of subrate channels and normal rate channels could be used. In such "mixed" rate applications, it is typical that only a fraction of the total traffic is switched at a subrate level. Indeed, the majority of the traffic is switched at the normal rate. As already described, existing, normal rate switches are not designed to efficiently and effectively switch subrate channels. Using a modular subrate switch designed specifically to switch subrate channels, the present invention efficiently and effectively performs the subrate switching functions demanded by a particular telecommunications application without having to redesign the normal rate switch.

Figure 2:
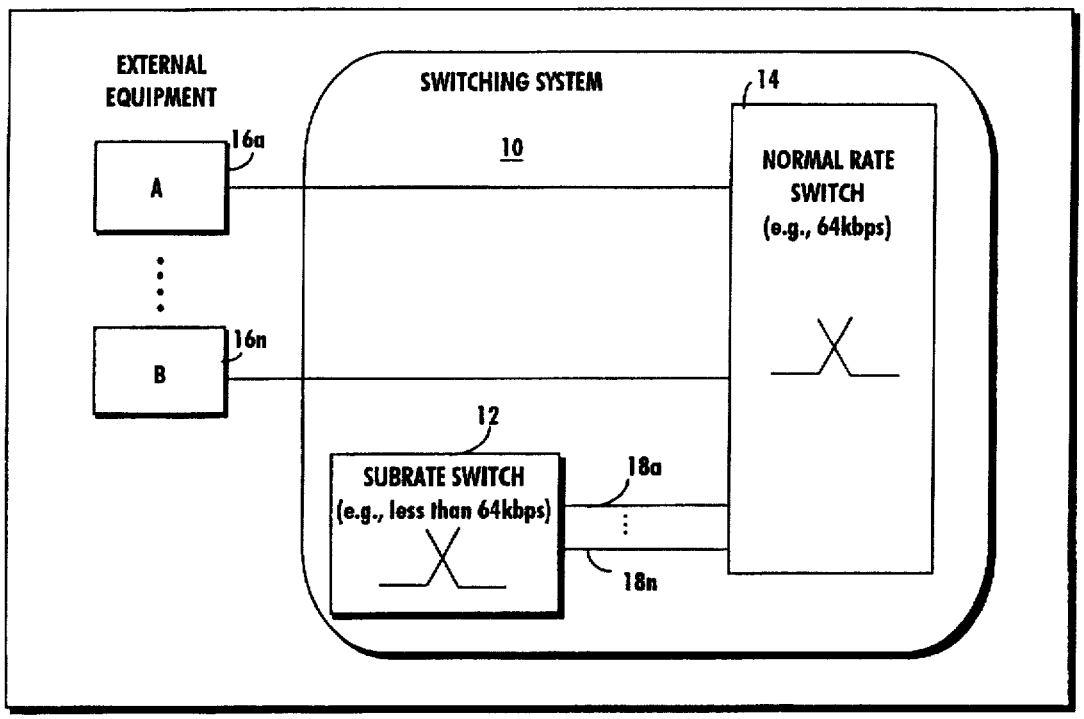
FIG. 2 is a high level diagram showing a telecommunications switching system in accordance with the present invention incorporating a modular, subrate, telecommunications switch with a normal rate telecommunications switch.

FIG. 2 illustrates at a basic level the "add-on" subrate switching architecture. More particularly, a telecommunications switching system 10 includes a normal rate switch (with normal defined in the example used throughout this description as 64 kbps) and a subrate switch 12 for switching subrate channels transmitted at less than 64 kbps. Thus, traffic which is from/to external telecommunications equipment 16a ... 16n is switched at a normal rate through normal rate switch 14. Subrate switch traffic from/to external telecommunications equipment is routed via connections through the normal rate switch 14 to the subrate switch 12 specially allocated to handle subrate channel switching.

The subrate switch 12 is connected to the normal rate switch 14 by way of one or more links 18a ... 18n with each link containing a number of timeslots. The subrate switch 12 connects any bit in any timeslot coming from the normal rate switch 14 to any bit in any timeslot returning to the normal rate switch 14. To connect a subrate channel C from external telecommunications equipment A to subrate channel D on external telecommunications equipment B, the following procedures are performed. First, a normal rate connection is established in the normal rate switch 14 from the timeslot on external telecommunications equipment A which contains a subchannel C to any free timeslot on the subrate switch 12. Second, a connection is established through the normal rate switch from any other free timeslot on the subrate switch 12 to the timeslot on external telecommunications equipment B containing subchannel D. Third, a connection is established in the subrate switch 12 between the appropriate bit or bits (corresponding to the desired subchannels) within the timeslots selected in the first and second procedures. While the connections through the normal rate switch 14 to the subrate switch 12 may be made "on demand," such connections may also be established as semi-permanent connections if desired.

Thus, traffic to be switched at the normal rate is switched through the normal rate switch 14 as usual. Subrate traffic is switched through the normal rate switch 14 to subrate switch 12 which is specifically designed to handle optimally subrate switching. This architecture is particularly advantageous because it can be flexibly added onto the existing normal rate switch architecture originally designed for optimum operation at normal rate with minimum impact to that existing switch architecture. In this way, subrate switch traffic can be optimally handled by the subrate switch module with minimal impact on the hardware of the existing switching system.

Figure 3:
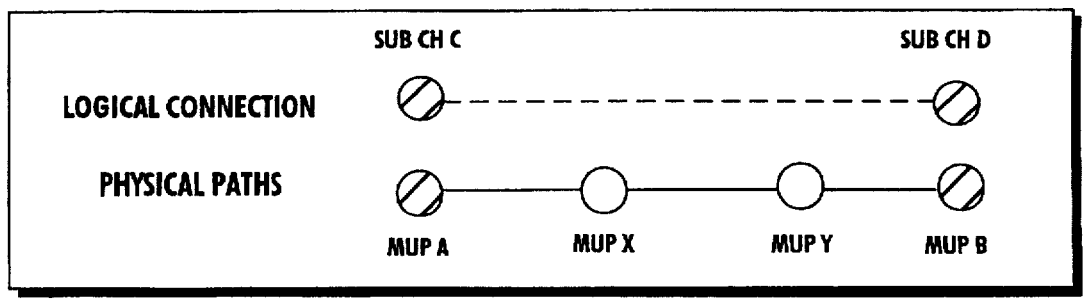
FIG. 3 is a path model illustrating basic connections made between the normal rate and subrate switches shown in FIG. 2.

FIG. 3 shows a path model useful in explaining how a subrate connection is established. In order to simplify and generalize the path model, MUltiple Position nodes (MUP) are defined. Each MUP corresponds to a position to which a generic device is connected to the switch. One MUP specifies one normal rate channel (one timeslot) terminated at a switch port. Since a switch port terminates several timeslots, the port itself corresponds to several MUPs. A switch connection or switching path may be made between MUPs.

As illustrated in FIG. 3, a subchannel connection uses three physical paths to connect or switch two subchannels. Subchannels C and D are provided (along with other subchannels) at MUPs A and B, respectively. MUPs X and Y are located in the range where the subrate switch is connected. Accordingly, a transfer connection is established between incoming MUP A and MUP X. This is a normal rate connection established in the normal rate switch 14 to link an incoming timeslot to the subrate switch 12. Then a transfer connection is established connecting MUP Y to outgoing MUP B. This again is a normal rate connection established in the normal rate switch 14 to link the subrate switch to an outgoing timeslot. Then a subchannel connection is established to connect subchannel C to subchannel D. For purposes of illustration, this subrate connection may be an N×8 kbps connection (where N is an integer from 1–7) established in the subrate switch 12, i.e., 8, 16, 32, 40, 48, and 56 kbps.

By means of the two normal rate connections, the subchannel C is terminated at MUP X in the same subchannel position it has at MUP A, and the subchannel D is terminated at MUP Y in the same subchannel position of MUP B. These two normal rate connections are considered "transfer" or "carrier" connections. Then a subrate connection is established to connect subchannels C and D. These "carrier" connections may be semipermanent. If they are "on-demand" connections, one or two carriers could be already established for other connections; in this case, only two or one connections must then be established.

Thus, to create a subrate connection, a call request identifies incoming and outgoing MUPs and subchannel information indicating the appropriate sub-MUPs as well as the requested rate for the connection, i.e., the value of N. This information is then used by control computers/processors that control the switching system 10 to determine the timeslots and subchannels to be used in the connection. The subchannel connection is established in subrate switch 12 between the subchannel C at MUP X and the subchannel D at MUP Y. At the logical level of the call request shown in FIG. 3, the necessary call set up information includes MUP A, a subchannel in MUP A (i.e., subchannel C), MUP B, and a subchannel in MUP B (i.e., subchannel D). From this information, the processor chooses the three physical paths needed for that connection.

Figure 4:
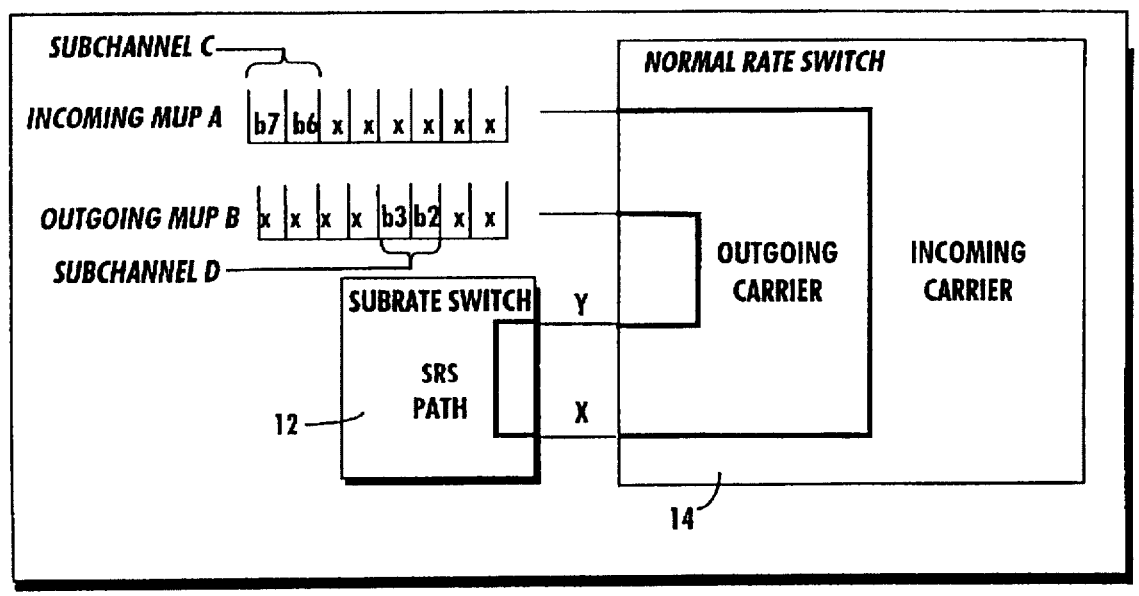
FIG. 4 is a diagram illustrating how a subrate connection is implemented between incoming and outgoing carriers through the normal rate and subrate switches.

FIG. 4 shows how bits of a subchannel are switched. The three linked physical paths correspond to one carrier from the incoming MUP A to the subrate switch 12 at MUP X, a path through the subrate switch 12, and a carrier from the subrate switch from is MUP Y to the outgoing MUP B. The subrate switch 12 switches the subchannel C at bit positions 7 and 6 in the incoming timeslot to the requested subchannel D at bit positions 3 and 2 in the outgoing timeslot.

Figure 5:
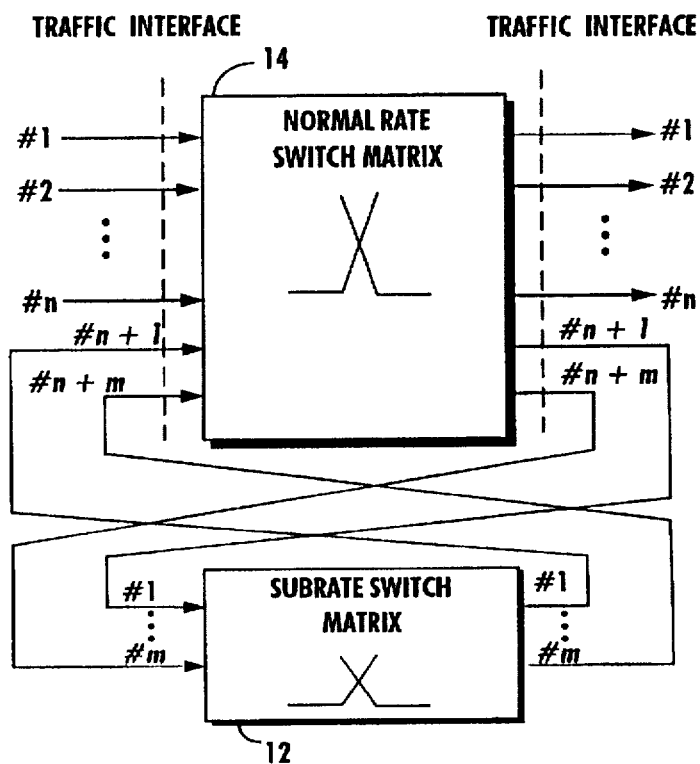
FIG. 5 is a more detailed overview of the interface between the normal rate and subrate switches.

FIG. 5 is a general overview of how the normal rate and subrate switches are interfaced. For purposes of illustration only, FIG. 5 shows traffic flowing in one direction (from the left to the right). Of course, those skilled in the art will appreciate that traffic typically flows in both directions. A first group of traffic interface ports (#1-n) of the normal rate switch 14 is allocated for traditional normal rate traffic. A second set of traffic interface ports of the normal rate switch 14 (#n+1) through (#n+m) is allocated for routing subrate traffic between the normal rate switch 14 and the subrate switch 12. The subrate switch includes a plurality of incoming and outgoing interface ports (#1-m). Accordingly, the subrate switch 12 is only connected to the normal rate switch and does not interface with external telecommunications equipment which further enhances its modularity and minimizes its impact on existing equipment.

Figure 6:
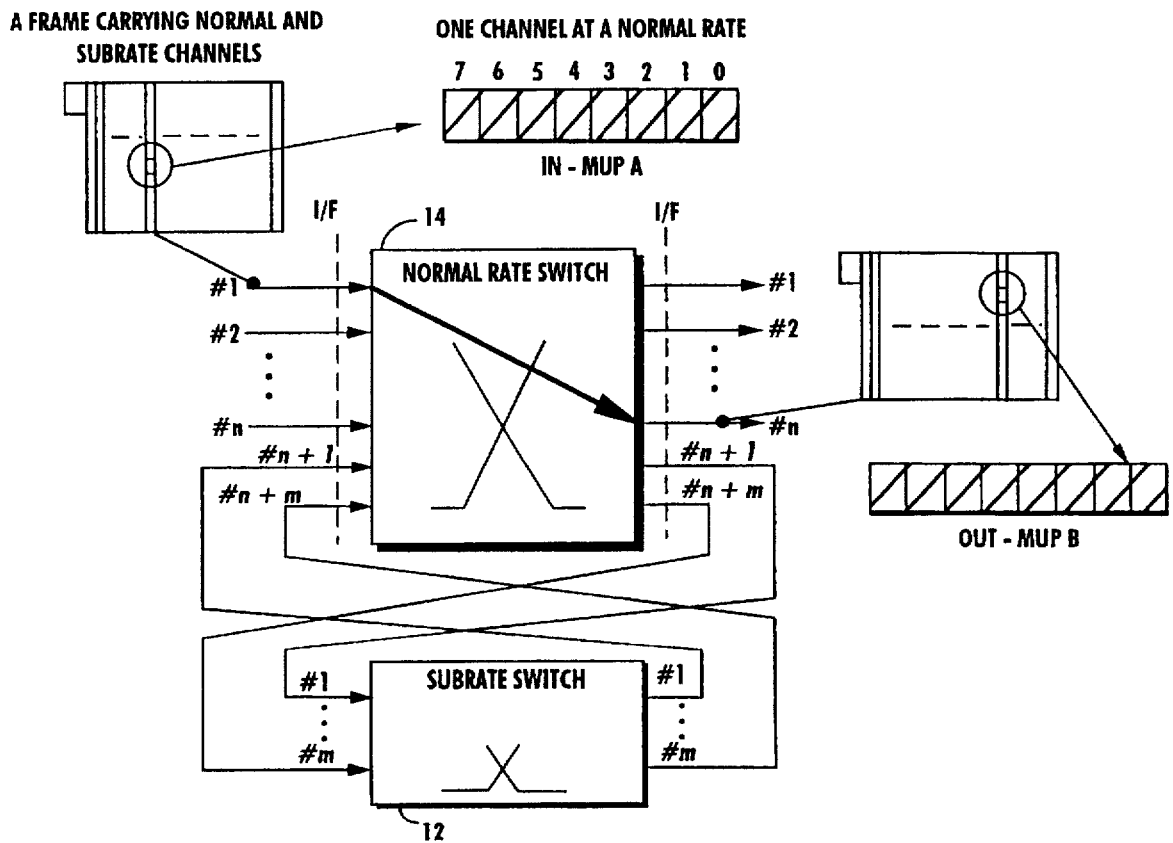
FIG. 6 shows an example routing of a normal rate channel through the normal rate switch.

Referring to FIG. 6, normal rate channels are switched through the normal rate switch 14 from an in-MUP A carried by the frame terminated at port #1 to an out-MUP B carried by the frame terminated at port #n. The illustrated frames are SONET or Synchronous Transmission Mode (STM)-n type frames. In the example of FIG. 6, in-MUP A is connected to out-MUP B. In this normal rate connection, one 8-bit timeslot corresponding to a single normal rate channel is connected from in-MUP A to out-MUP B.

Figure 7:
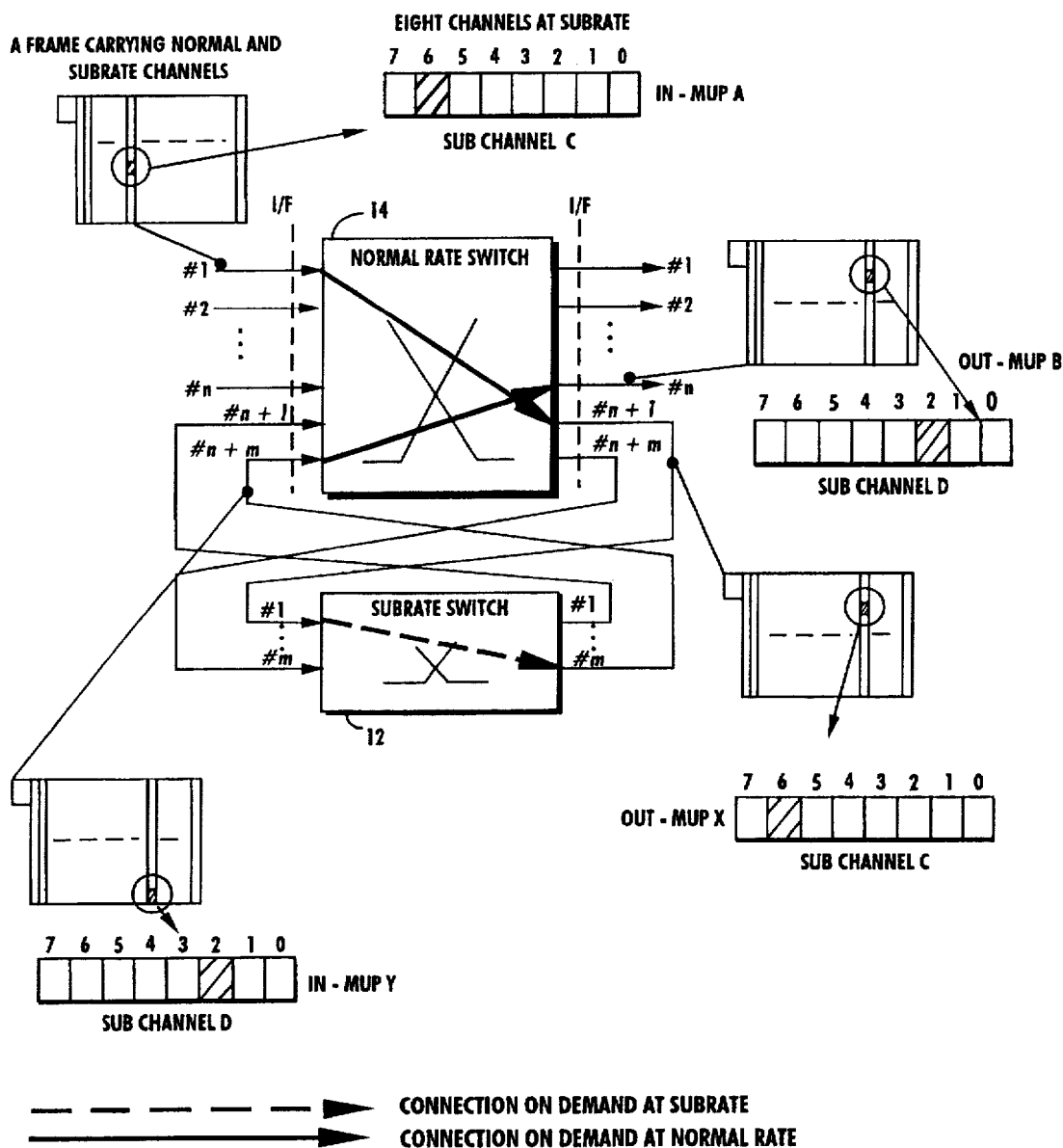
FIG. 7 shows an example routing of a subrate channel through the normal rate and subrate switches.

FIG. 7 shows an example connection of a subrate channel C to a subrate channel D at a rate corresponding to one-eighth of the normal rate. In other words, subrate channel C corresponds to one bit at bit location 6 in the timeslot which is switched ultimately to bit position 2 in the timeslot out-MUP B. Thus, the normal rate timeslot that contains subrate channel C received at in-MUP A (at port #1) is routed through normal rate switch 14 to out-MUP X (at port #n+1). Note that subchannel C remains at bit location 6. The timeslot including subchannel C is then routed to port #1 of subrate switch 12 which performs the subrate switching, i.e., switching subchannel C at bit location 6 in the incoming timeslot to subchannel D at bit position 2 in a different outgoing timeslot. The outgoing timeslot including subchannel D is routed from subrate switch port #m to incoming MUP Y (at port #n+m) of the normal rate switch and is then routed through the normal rate switch to outgoing MUP B (at port #n).

Figure 8:
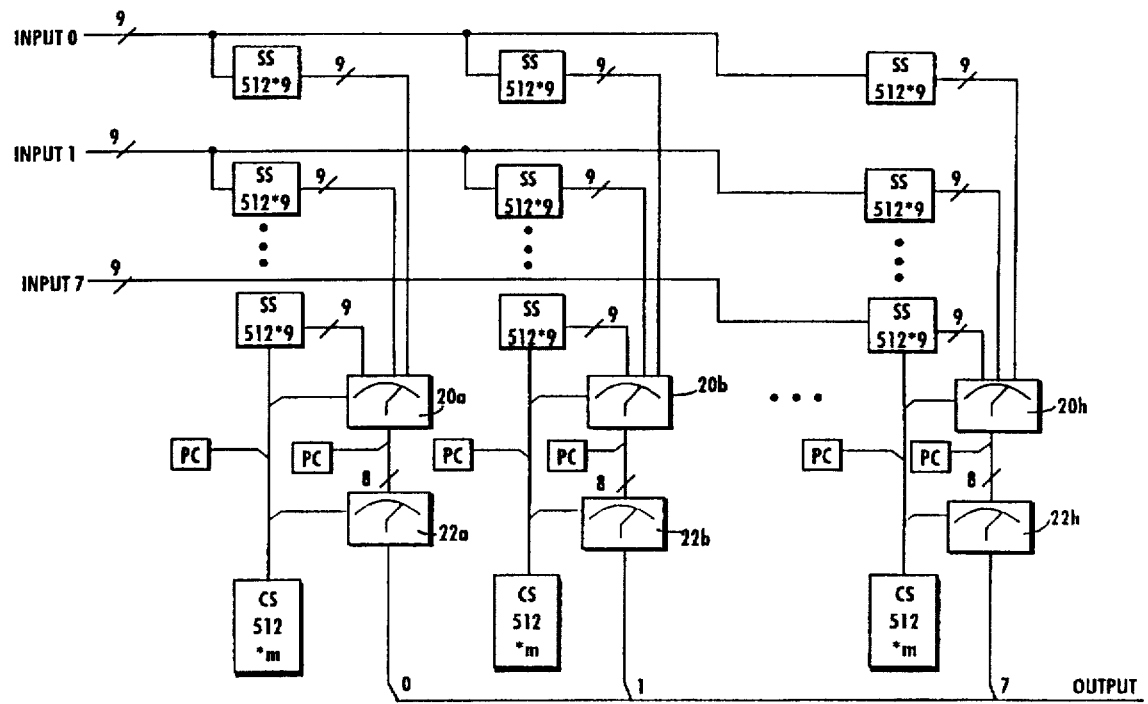
FIG. 8 is a function block diagram illustrating the logical structure of the subrate switch architecture in accordance with one embodiment of the invention.

As described above, one of the benefits of the add-on subrate switch is that it is optimally designed to switch subrate traffic. A function block diagram of the logical structure of one example subrate switch 12 is shown in FIG. 8. There are eight TDM input buses 0–7 which may each include, for example, consecutive 512 timeslot frames to produce a data rate of 4.096 Mbps. There are eight columns of switch stores (SS) with each column corresponding to one bit of the 8-bit output timeslot. Each switch store may be, for example, a random access memory (RAM) having a word width of 9-bits and a length of 512 words. Eight of the bits correspond to one timeslot of information to be switched, and the ninth bit corresponds to a parity bit for error checking. Accordingly, each switch store memory is able to store one frame of timeslot information at a time. In addition, the same frame information from each input bus is simultaneously stored in each of the eight switch store memories in that row. Thus, in one column there are as many switch store memories as the number of input ports. Each switch store memory stores a frame of data incoming at the corresponding input port, and in this way, all incoming data are available in a column for switching. Since one column corresponds to a specific bit position in one output port, it is used to switch at that specified bit position any input bit coming from any input port. FIG. 8 illustrates eight columns in the switch matrix to show an example of subrate switching from eight input ports to one output port. This structure would therefore be replicated eight times to effect subrate switching from eight input ports to eight output ports.

A control store (CS) memory is provided for each of the eight columns. Like the switch store SS, the control store CS may be a RAM memory for storing 512*m bit wide control words. The width of each word in a control store is the sum of the bits used for the following: a switch store address, an address for a first set of timeslot selectors 20a ... 20h, an address for a second set of bit selectors 22a ... 22h, and parity. The switch store address, in this example, includes 9 bits in order to select one of the 512 timeslot words stored in each speed store. The address for the timeslot selectors 20a ... 20h includes 3 bits to select one of the eight switch stores in the column. The address of the bit selector would include 3 bits to select one of the eight bits of the 8-bit timeslots selected by the timeslot selector for that column. Parity typically includes one bit. Accordingly, the width of the control store word in the example matrix shown in FIG. 8 may be 16-bits. However, an additional bit may be added to each control store location to mark semi-permanent connections as opposed to on-demand connections. The parity checkers (PC) perform parity checking functions on the timeslot data. Each control store is addressed using an output from a timeslot counter (not shown).

In the logical structure of the subrate switch of FIG. 8, each one of the eight columns produces one bit of the 8-bit output. The eight switch stores in each column and following timeslot selector (which may be a multiplexer—but a bus could be used instead of a multiplexer) supply one complete timeslot from one of the input ports. The second selector (which may also be a multiplexer) selects one bit from this selected timeslot. For each bit of each outgoing timeslot, the subrate switch therefore has one location in the control store. The contents of that control store location define a specific bit in a particular switch store which should be read. In this way, the subrate switch is able to switch in both time (the switch stores) and space (the selectors 20 and 22) individual bits from one subchannel multiplexed onto one normal rate timeslot to another subrate channel in a completely different normal rate timeslot. Thus, the subrate switch employs a time-space (TS) switch architecture. The TS switch is strictly non-blocking.

Consider the following simple example. Assume that the subrate channel to be switched is a 16 kbps subrate channel, i.e., it occupies two 8 kbps subrate channels. To switch the 16 kbps channel from bit positions 0 and 1 in a timeslot at location 220 in the frame at input port 5 to bit positions 2 and 3 in a timeslot location 300 at output port 3, the control store controlling bit position 2 at output port 3 must address in correspondence with output location 300 the bit position zero in memory location 220 at input port 5. The control store controlling bit position 3 at output port 3 must address in correspondence with output location 300 the bit position 1 in memory location 220 at input port 5.

Figure 9:
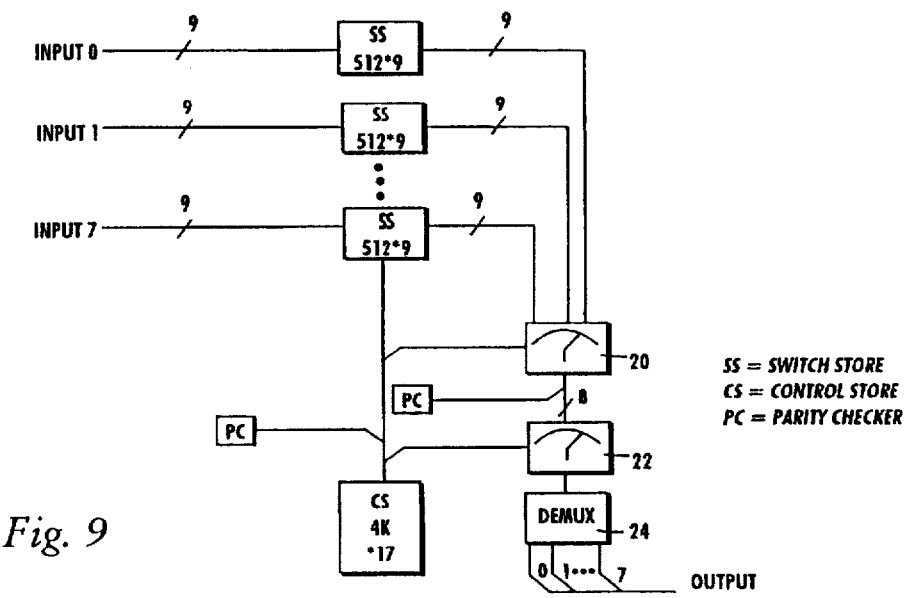
FIG. 9 is a function block diagram illustrating the logical structure of the subrate switch architecture in accordance with another embodiment of the present invention.

FIG. 9 shows an alternative embodiment for the logical structure of the subrate switch. This alternative embodiment utilizes the fact that all switch stores in a row of the memory matrix shown in FIG. 8 contain the same timeslot data. Accordingly, the eight switch stores in each row are replaced with a single 512 word by 9-bit RAM in which each timeslot is written only once but then read out eight times. To achieve eight read operations in one timeslot, the memory access rate must be 36.864 MHZ (4.096 Mbps×9). Although not illustrated, the eight columns shown in FIG. 8 could also be reduced to two columns which would require only four memory read operations. Although not necessary, each of the eight control stores shown in FIG. 8 may also be combined into a single control store having 4K words by M bits where M is 17 for a 4K size subrate switch (i.e., the example size switch shown in FIGS. 8 and 9). The control store CS would also then be read eight times per timeslot with one cycle per timeslot being available for a control store read or a control store write by a controlling processor. A 9-bit, one of eight multiplexer 20 selects parallel data from one of the switch stores. The multiplexer 20 output is parity checked by a parity checker PC, and a one of eight multiplexer 22 then selects one bit of the data. Both multiplexers 20 and 22 are switched eight times per timeslot by the control store CS. A demultiplexer combines the eight single bits output generated by multiplexer 22 into an 8-bit timeslot output.

FIG. 10 shows still another example embodiment of a subrate switch architecture which may be employed with the present invention. Since the number of logic gates per bit and the power dissipated per bit both decrease as the size of a RAM increases, the subrate switch design could be even further improved by using larger memory blocks. Using two write operations and eight read operations per timeslot, pairs of 512*9 switch stores may be combined into 1024*9 switch stores as indicated in FIG. 10. The 4K*17 control store executes eight read operations in each timeslot. The operation of this embodiment of the subrate switch is similar to that for the earlier embodiment shown in FIG. 9, except that four, one-of-two multiplexers 26a . . . 26d, alternate between input pairs and a write operation is added to achieve a total of two "writes" per timeslot. Using four larger RAM blocks for the switch stores rather than the eight RAM blocks shown in FIG. 9 or the 64 RAM blocks shown in FIG. 8, the number of logic gates per bit and the power dissipation per bit is reduced. Assuming that further increases in memory access rates may be obtained, even larger block switch stores could be used. For example, if four write operations and eight read operations are made per timeslot, 2048*9 switch stores could be used, thereby further reducing the number of memory blocks to two.

For subrate switches employing the architecture of FIGS. 9 and 10, a single control store with 4096 words of 17 bits is used. The control store address is 12 bits of which 9 bits represent the outgoing timeslot number and 3 bits the outgoing bit number as shown in FIG. 11. The control store location employs the format illustrated in FIG. 12. Note that in FIG. 12 there is no busy/idle flag. An idle timeslot is indicated by all zeros in bit positions 0–14. If these bits are all zero, the outgoing data is set to an idle bit pattern value. This format is therefore advantageous in that it reduces the width of the control store by 1 bit. The S flag at bit location 15 marks a semi-permanent connection and is used during restart. The parity bit P is generated and checked within the subrate switch.

Viewing the subrate switch architecture at a higher level, time switching is accomplished in switch stores under the direction of control stores. Each switch store location of the matrix is written in sequential order one time per frame according to a timeslot counter associated with the input frame. The switch stores in a single column of the matrix are read in random order according to the contents of the control store associated with an outgoing link. At the same time, each control store is read in sequential order one time per frame according to the timeslot counter output. Space switching is performed by selecting timeslots from one of the switch stores of a column with multiplexer 20 by a control store associated to the outgoing link (i.e., the timeslot is switched in space).

Figure 13:
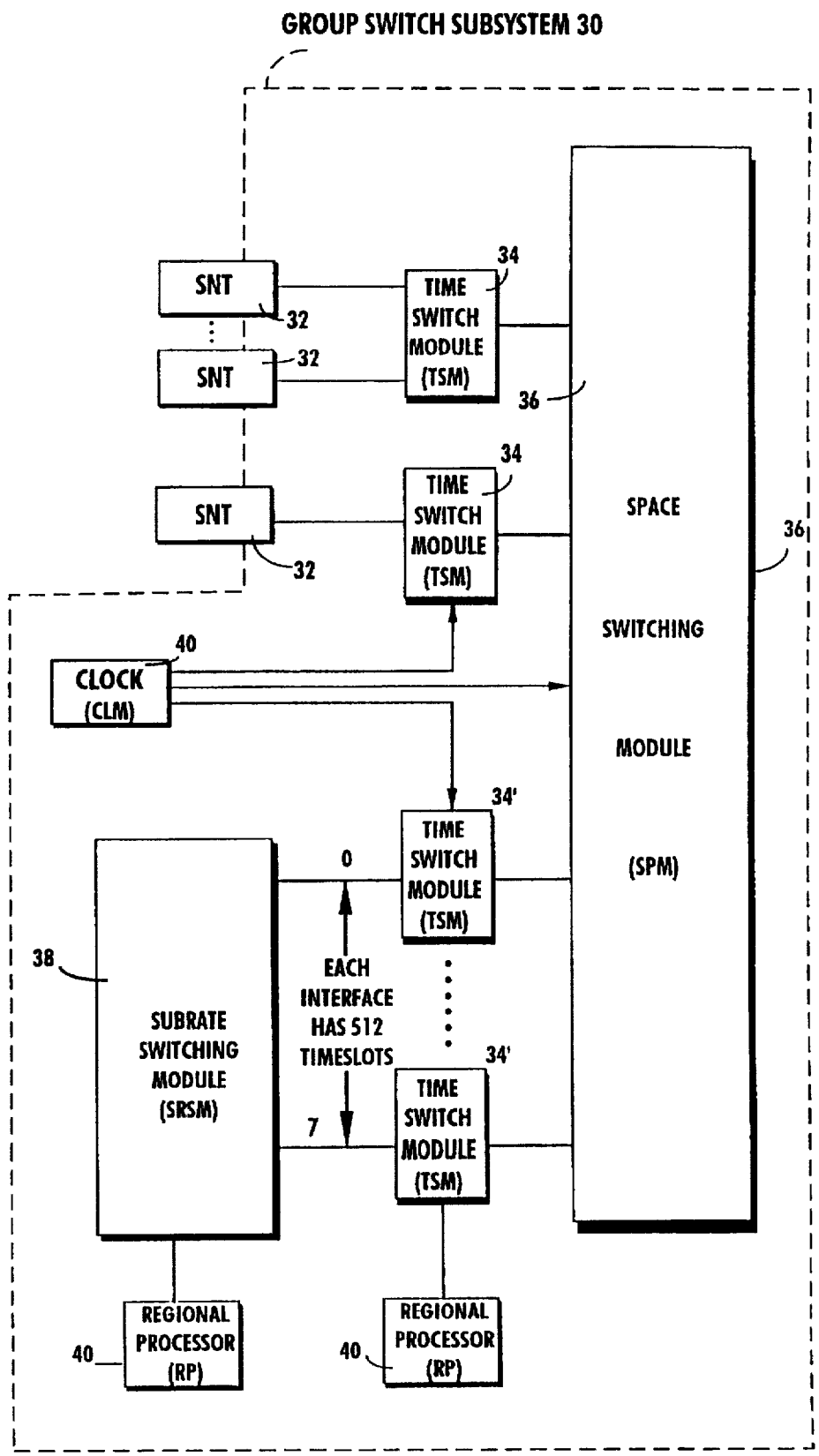
FIG. 13 is a function block diagram illustrating the adding on of a subrate switching module to an existing time space time telecommunications switch referred to as the group switch subsystem.

The subrate switch module unit in accordance with the present invention will now be described as a modular add-on switch to an existing telecommunications switch, namely, the group switch subsystem (GSS) based on a GS64K of the well known Ericsson AXE-10 telecommunications switching system (FIG. 13). The group switch subsystem 30 employs a time-space-time (TST) switch architecture. Incoming and outgoing calls are interfaced to the group switch subsystem through switching network terminals (SNTs). Input switching network terminals 32 are connected to an incoming time switch module (TSM) 34. The time switch modules 34 are connected to a space switching module (SPM) 36. The subrate switching module 38 is also interfaced with the space switching module 36 via time switch modules 34'. A clock module 40 synchronizes the timing of all modules in the group switch subsystem 30. A central processor (not shown) and Regional processors 40, maintain a database map of system configurations for the different types of equipment connected to the switch and the different types of channels at switch interfaces. Using this database information, the processors control the operation and routing of switching paths through the group switch subsystem 30.

More particularly, the subrate switch module 38 is connected to the normal rate group switch by eight (0–7) TSMs 34'. Each TSM 34' interface includes 512 timeslots. As described above, each bit of each outgoing timeslot in the subrate switch module corresponds to one location in a subrate switch module control store. Thus, the contents of each control store location defines a specific bit in a switch store (SS) to be read. In order to connect a channel of more than 8 kbps, the regional processors must write addresses in more than one control store location. For example, to set up a 24 kbps connection (3 bits of a normal rate 8-bit timeslot), requires that three addresses must be written in control stores (i.e., one control store location per bit).

The actual detailed architecture and operation of the group switch subsystem is known and not repeated here. In brief, the time switch modules (TSMs) implement time switching, and the space switch module (SPM) implements space switching. The TSMs handle the transmission and reception of speech samples using various switch stores. Speech samples are written into an incoming speech store in a fixed order, but when those samples are read out, the order is determined by addresses in a control store. The time switch modules also have an additional control store which is used to control the operation of electronic gates in the space switch module (SPM) to selectively transfer speech and data through the group switch. In essence, this space switch control store is used to connect incoming and outgoing TSMs.

Figure 14:
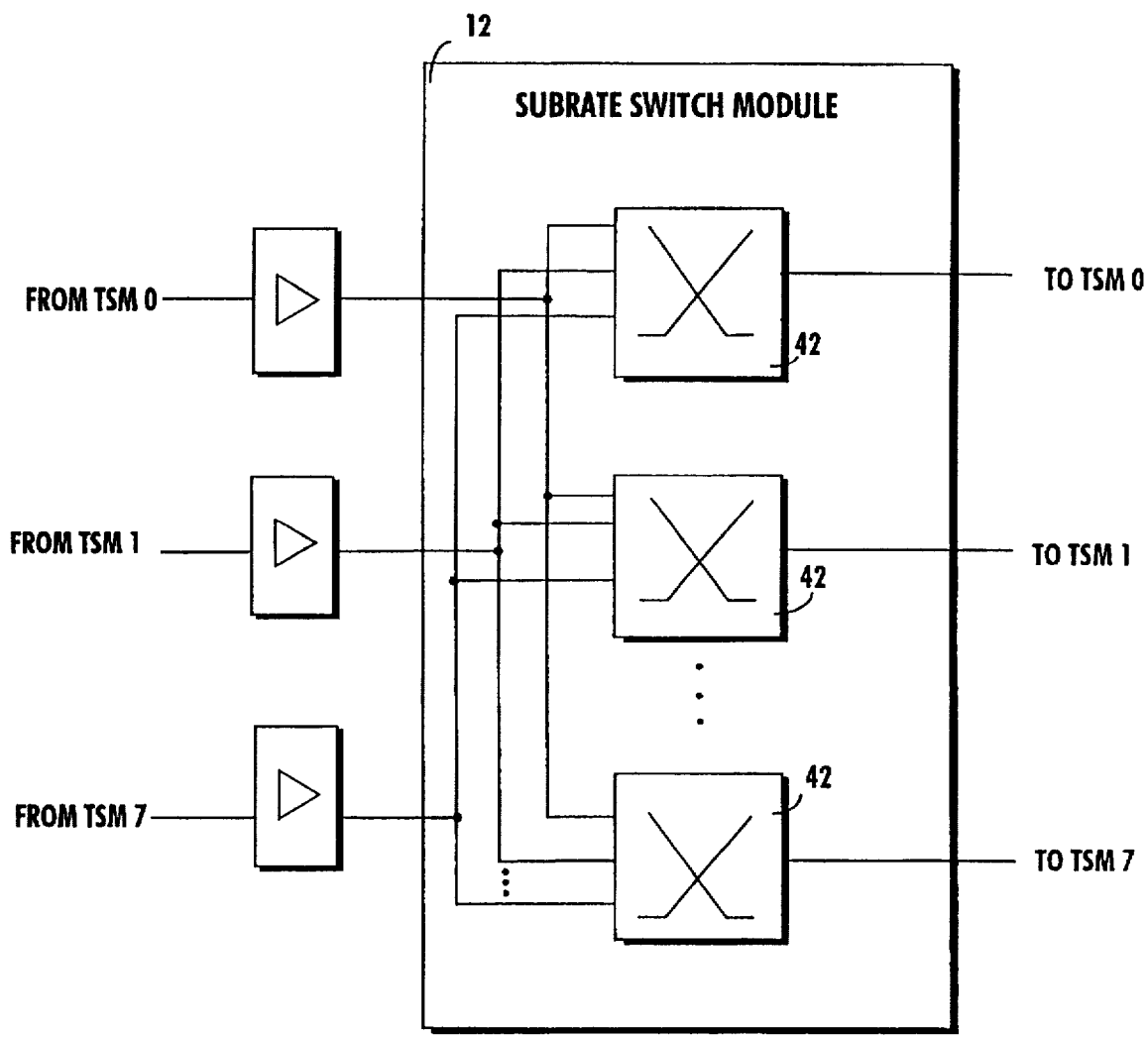
FIG. 14 illustrates in further detail preferred subrate switching connections between time switching modules (TSMs) in the group switch subsystem.

FIG. 14 shows one particular implementation architecture in this group switch embodiment. In order to provide convenient implementation and maintenance of the subrate switch module 12 in the group switch subsystem the subrate switch module 12 may be partitioned into units corresponding to the size of a time switch module (TSM). One partitioned unit corresponds, for example, to what is illustrated in FIGS. 8, 9, or 10. With this partitioning, the subrate switch store matrix is divided into subrate switch units 42. Each subrate switch unit 42 includes an outlet going to only a single time switching module (TSM). Moreover, each subrate switch unit 42 includes inlets from TSMs connected to the subrate switching module (SRSM) 34'.

The procedures for setting up and releasing a two-way subrate connection on demand in this group switch subsystem (GSS) embodiment will now be described. An "on-demand" subrate connection is initiated by the generation of a subrate path signal from the GSS user. That signal contains data relating to the incoming GSS-MUP, the incoming subchannel position, the outgoing subchannel position, the outgoing GSS-MUP. Data related to subchannel position also identify the particular rate of the subrate connection required.

Upon receiving the subrate connection command, the central/regional processors establish the three paths that constitute a subrate connection as described above in conjunction with FIG. 3: the incoming carrier, outgoing carrier, and subrate switch path. Of course, the incoming and outgoing carriers may be established as on-demand connections or as semi-permanent connections. The release of the subrate two-way connection is ordered by the GSS-user; the release signal contains the in-MUP and the subchannel position in the in-MUP. Once received, the subrate connection in the subrate switch is released. The two carrier connections are released if no other subrate connections exist on them.

Figure 15:
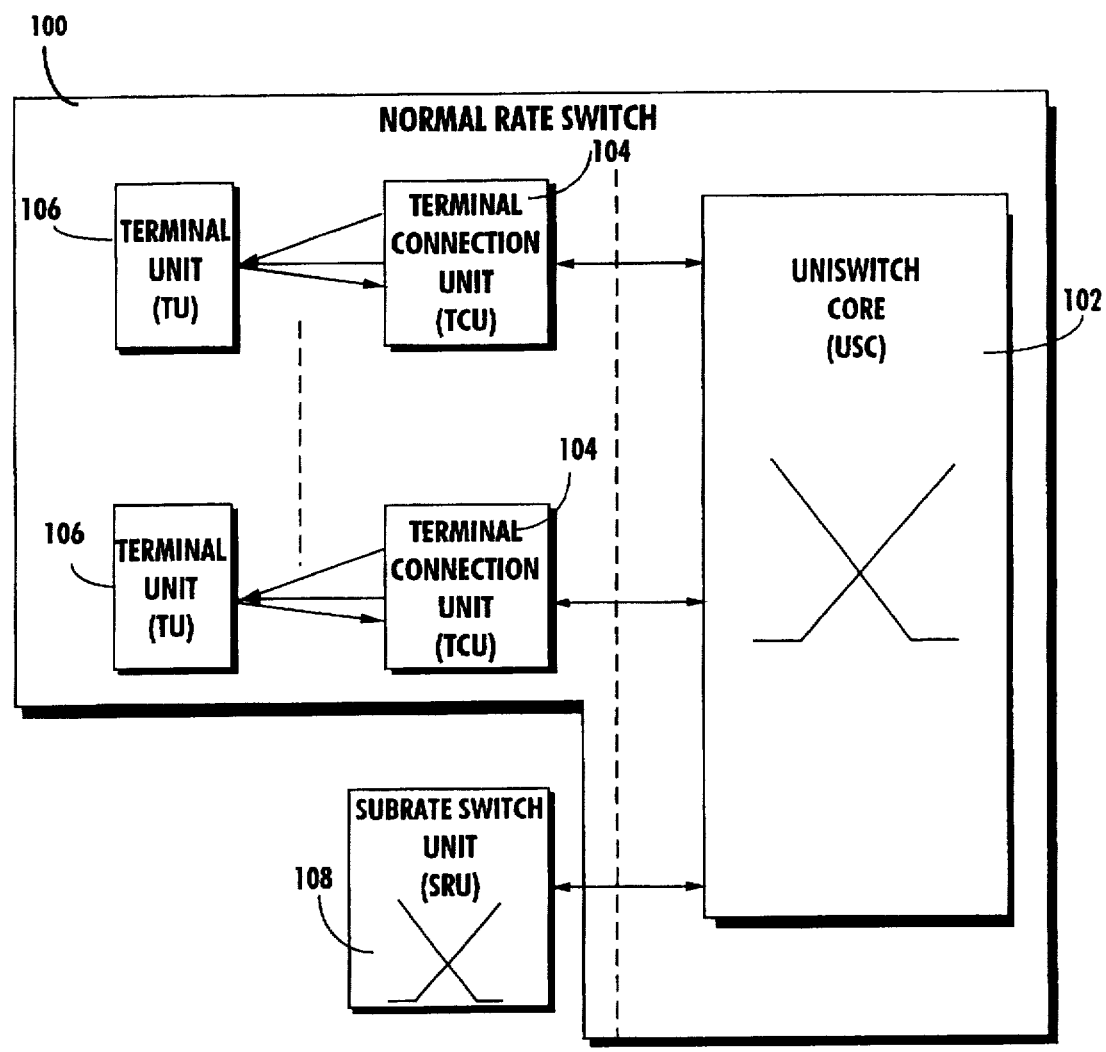
FIG. 15 is a function block diagram illustrating the application of the modular subrate switch to a currently developed Uniswitch time-space configured telecommunications switching system.

Another example application of the add-on subrate switch in accordance with the present invention relates to currently evolving switching main telecommunications switch technologies (as opposed to well-established existing switch designs like the group switch subsystem based on the GS64K). An example of such a newly developed technology is the Ericsson group switch subsystem based on Uniswitch as shown in FIG. 15. The Uniswitch is a synchronous transfer mode (STM) switch based on 125 microsecond frames with 64 kbps timeslots. The Uniswitch is basically a non-blocking, time-space switch that does not require internal path selection, and therefore is provides minimal time delays through the switch. The Uniswitch 100 includes a Uniswitch core 102, the terminal connection unit (TCU) 104, and the switch termination units located on terminal units (TU) 106. Anything connected to the Uniswitch is a terminal unit (TU) 106. The terminal units interface users and the Uniswitch. A STU is a switch port located on the TU which generates/terminates the USI interface used between two units within the Uniswitch. Two interfaces with different bit rates are provided, i.e., USI2 and USI4. The TU may be connected to the Uniswitch core directly or via TCU. The TCUs 104 are multiplexers in which data between connected terminal units 106 and the Uniswitch core 102 is mapped; no switching takes place in the multiplexers so the timeslot order is preserved.

Like the group switch subsystem based on GS64K, the detailed architecture and operation of the Uniswitch is not the subject of the present invention. However, a more detailed description of the Uniswitch is provided in the article "Uni-Switch—A New Flexible STM Switch Fabric Concept," Peter Lundh and Sture Roos from the Ericsson Review No. 3, 1995, pages 2–12.

Figure 16:
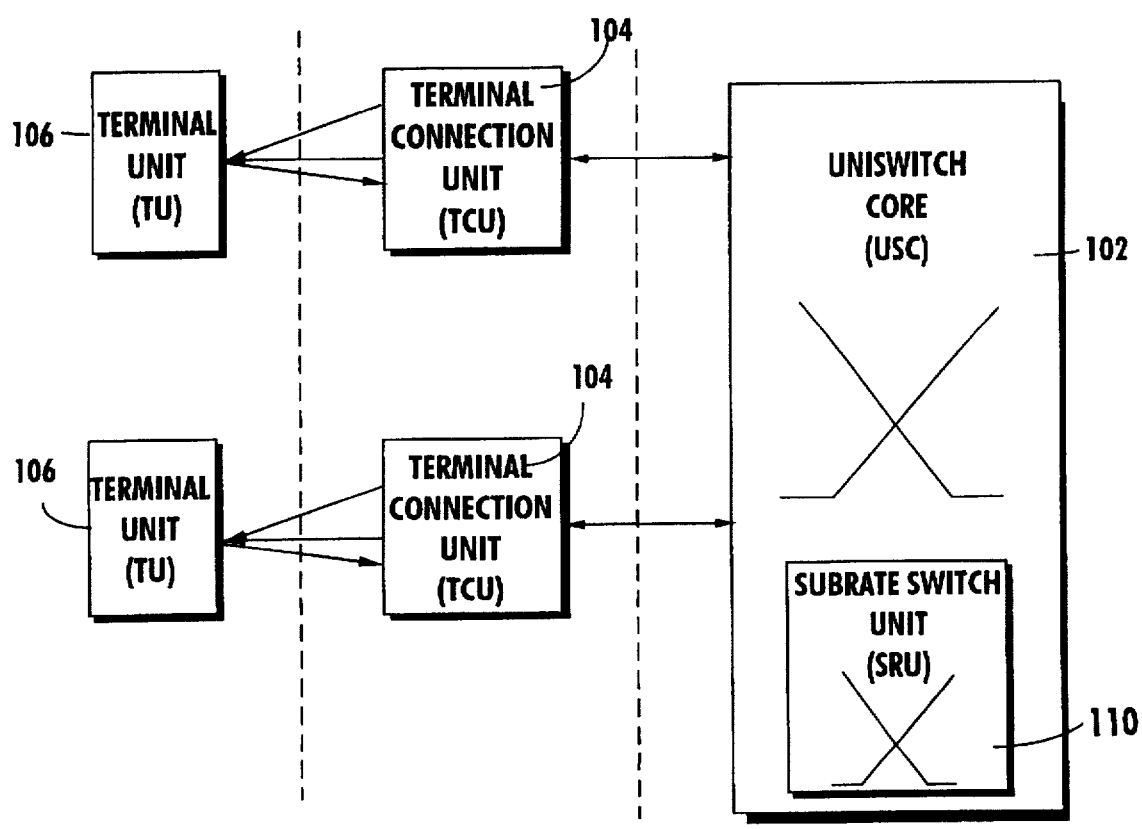
FIG. 16 is a function block diagram of the subrate switch configured as a subrate extension unit of the Uniswitch switching architecture.

FIG. 15 also includes a subrate switch unit (SRU) 108 added onto the normal rate Uniswitch switch 100. Thus, from the perspective of the Uniswitch core 102, the subrate unit 108 is viewed as a TCU. Alternatively, the subrate switching module could be incorporated as an extension unit implemented as a special board that can be inserted in the same magazine that houses the normal rate boards of the uni-switch core 102 as shown in FIG. 16.

Figure 17:
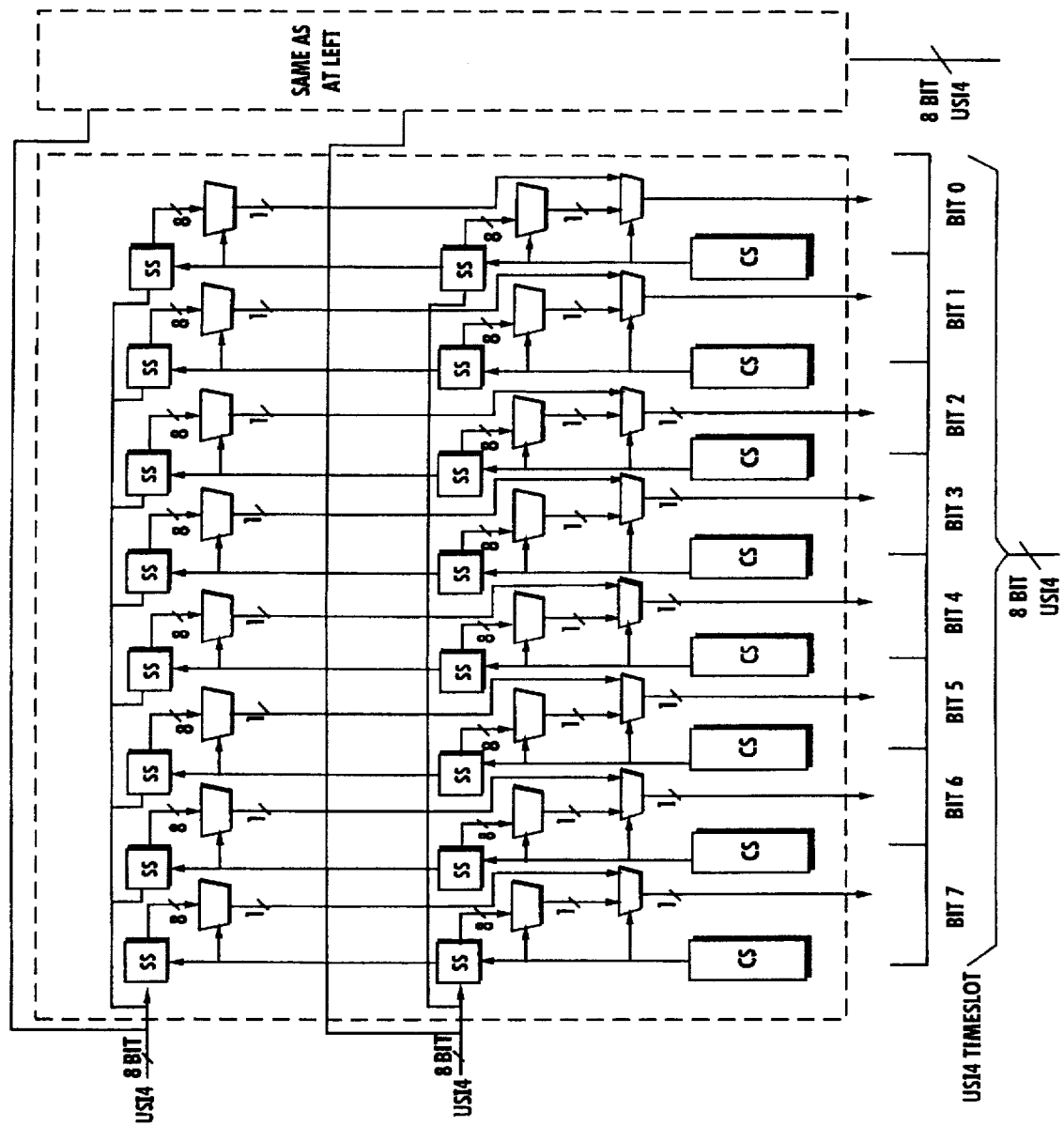
FIG. 17 is a function block diagram of the subrate switch matrix structure in accordance with the Uniswitch application.

A specific example of the subrate switch used in the Uniswitch is shown in FIG. 17. The subrate switch matrix is similar in structure and operation to the subrate switch shown in FIG. 8. One incoming USI4 portion of a frame is stored in eight logical switch stores (SSs), there being 2560*8-bits in each switch store. One control store (CS) controls the reading out of each bit of each timeslot word per output bit. Thus in this example, one control store is 2560*18-bits, with one bit being used to address one of the two Uniswitch Interface (USI4) links, 12 bits being used to address 2560 locations, 3 bits to address one bit from the 8-bit timeslot at the addressed location, and 2 bits to define whether the outgoing subchannel is idle/busy and to handle an offset switching mechanism described in the above-referenced article. The control store addresses a single switch store location, reads out a timeslot, and then drives an 8:1 multiplexer to select the address bit of the timeslot to be inserted into the appropriate bit position (subchannel switching) of the outgoing timeslot. The control store also controls the 2:1 multiplexer to select the addressed USI input. In contrast to the timeslot read out from the switch memories described for FIGS. 8–10, the architecture shown in FIG. 17 is such that an individual bit is first selected from a timeslot read out from the memory, and after that, the data memory itself is selected. Functionally the two embodiments are similar with differences being those of implementation.

Figure 18:
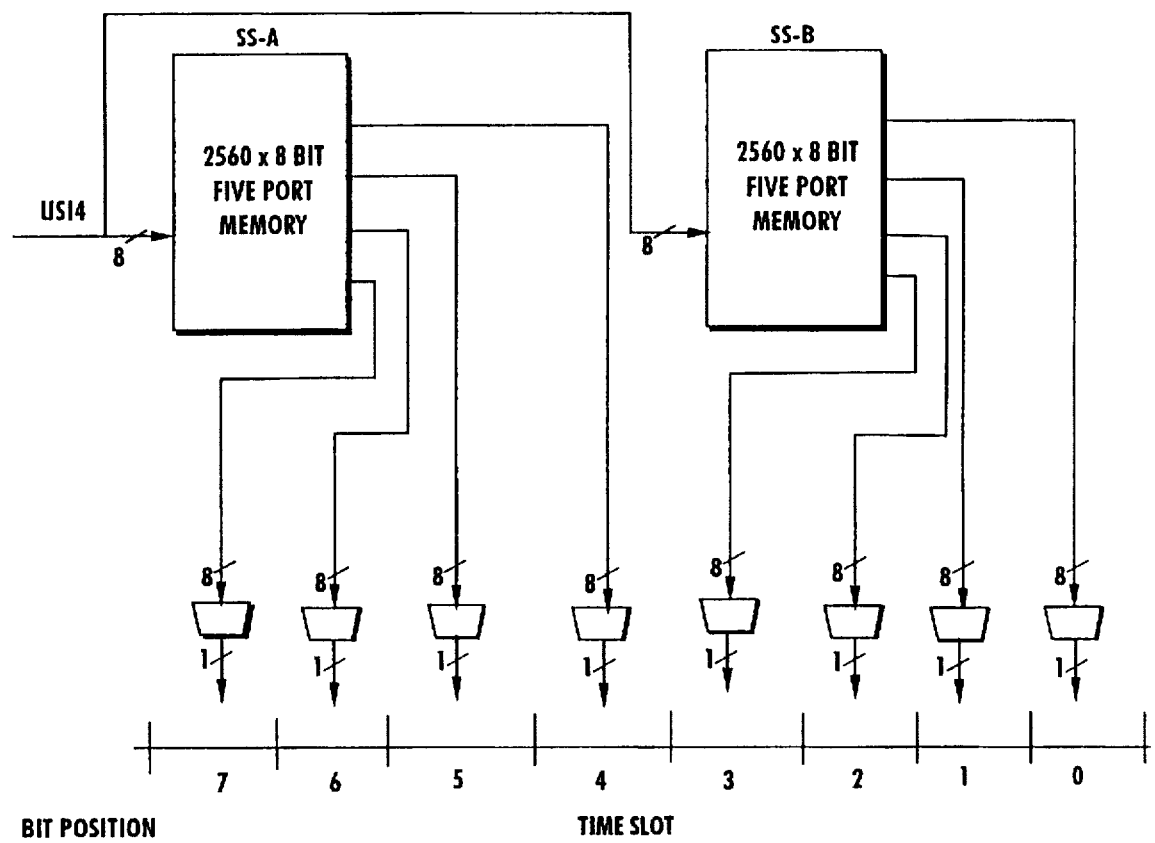
FIG. 18 is a function block diagram illustrating a preferred implementation structure of the subrate switch matrix illustrated in FIG. 17.

Another embodiment for implementing the structure of the subrate switch as compared to that shown in FIG. 17 is illustrated in FIG. 18 for a single USI4 port. The USI4 port is the port of the Uniswitch Core where the USI4 interface is terminated. The time division multiplexed signal received at this port includes 2560 timeslots. An assumption in the implementation in FIG. 18 is that five cycles are available for writing and/or reading in one timeslot cycle. In order to consolidate memory into a smaller number of memory blocks, four logical columns of switch store memories controlled by four control stores are implemented using one physical column of data memories controlled by four control stores. Since all the columns contain the same data, each timeslot can be written into memory once and read four times.

FIG. 18 represents the implementation of one row of eight SSs and 8:1 selectors represented in FIG. 17. Assuming that each memory block (SS-A and SS-B) is configured to store 2560*8-bits, each memory block is accessed five times during a timeslot cycle using the five independent ports for reading or writing. To store an incoming USI4 frame, one physical switch store is built on one memory block. Because one access port is used for writing an incoming timeslot, four read operations are available in one timeslot cycle. To perform time switching on single bits in the timeslot of the output USI4 frame, eight read accesses are performed, i.e., one access per bit position in the output timeslot. To accomplish eight reads in one timeslot, the switch store used to store the incoming frame is doubled lo because only four read accesses are available after the one write access. As a result, the two switch stores labeled SS-A and SS-B, each corresponding to one memory block, are used to store a USI frame from the input port. The first four bits of the timeslot of the outgoing USI4 are read from the SS-A memory, and the second four bits are is read from the SS-B memory. For each bit of the outgoing USI4 timeslot, there is an eight-bit bus to accommodate the eight bits read out from each memory block in one read cycle. An 8:1 multiplexer performs selection from the bus of the bit to be inserted in that bit position. For a switch matrix as shown in FIG. 17 terminating two USI4 interfaces, the configuration of FIG. 18 is repeated in a 2×2 matrix. A 2:1 multiplexer then selects the appropriate bit from one of the two SS's in the column.

Thus, in the present invention, subrate channel switching is performed efficiently using a modular, add-on subrate switch that is designed for optimal switching of subrate channels. That way, a normal rate switch designed to switch normal rate timeslots may continue to do so and can dedicate the subrate switch. The add-on modularity of the subrate switch architecture is particularly advantageous because of its minimal impact on normal rate switch architectures. Moreover, the architecture allows efficient switching for communications applications where both normal and subrate switching are required. While the exemplary embodiments described above show various implementations of the subrate switch to particular normal rate switch architectures, those skilled in the art will appreciate that the present invention can be adapted to other switch architectures as well.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A digital telecommunications switching system comprising:
   a main data transmission rate switch, connected by multiple bidirectional switch ports to multiple incoming and outgoing time-slotted digital lines, with each timeslot including a predetermined number of bits of data, for switching timeslots received from any one of the switch ports to another one of the switch ports at a first data transmission rate; and
   a subrate switch, connected to the main switch, for selectively switching one or more bits less than the predetermined number in a timeslot at a data transmission rate different than the first data transmission rate, wherein the subrate switch includes:
      plural columns and rows of data memories for storing input timeslots, each column corresponding to a single bit in an output timeslot, and
      a selection mechanism for selecting a timeslot in one of the row memories and selecting one or more of the column memories to permit selective switching of one or more individual bits contained in the selected timeslot through the subrate switch.

2. The system in claim 1, wherein plural slower data rate channels are multiplexed onto a single first data rate timeslot and received by the main switch on an input switch port and routed to the subrate switch which individually routes each slower data rate channel to a destination switch port at a data transmission rate that is slower than the first data transmission rate.

3. The system in claim 1, wherein the different data transmission rate is one of a plurality of slower data transmission rates.

4. The system in claim 3, wherein the first data transmission rate is 64 kbps and the plurality of slower data transmission rates include 8, 16, 32, 40, 48, and 56 kbps.

5. The system in claim 1, wherein the subrate switch is a nonblocking, time-space configured switch.

6. The system in claim 5, wherein the main switch is a time-space-time configured switch having a plurality of first time stages connected to input switch ports, an intermediate space switching stage, and a plurality of others of the time switching stages connected at one side to the space switching stage and at an opposite side to output switch ports.

7. The system in claim 5, wherein the main switch is a time-space configured nonblocking switch.

8. The system in claim 7, wherein the subrate switch is added-on as a modular extension of the time-space configured main switch.

9. The system in claim 1, wherein other main switch ports not connected to the incoming and outgoing lines are connected to input and output ports of the subrate switch.

10. The system in claim 1, the system further comprising:
    a plurality of control memories, each control memory corresponding to one of the columns of data memories in the matrix, for addressably selecting one bit of one timeslot from one of the data memories in the column to generate a single output bit with output bits selected by the control memories being combined into an output timeslot and returned to the main switch.

11. The system in claim 10, wherein each of the row and column memories is a random access memory for storing a frame of timeslots with each timeslot being individually addressable by a corresponding control memory and the selection mechanism includes a first multiplexer controlled by the corresponding control memory for selecting a timeslot from one of the data memories in the column and a second multiplexer for selecting an individual bit from that selected timeslot.

12. A digital telecommunications switching system comprising:
    a main data transmission rate switch, connected by multiple bidirectional switch ports to multiple incoming and outgoing time-slotted digital lines, with each timeslot including a predetermined number of bits of data, for switching timeslots received from any one of the switch ports to another one of the switch ports at a first data transmission rate; and
    a subrate switch, connected to the main switch, for selectively switching one or more bits less than the predetermined number in a timeslot at a data transmission rate different than the first data transmission rate, wherein the subrate switch includes:
       a column matrix of data memories, each data memory storing a frame of timeslot data, and
       a selector for each column for selecting a timeslot in one of the data memories and an individual bit in the selected timeslot to permit selective switching of one or more individual bits through the subrate switch,
       wherein one or more data memories of the column matrix of data memories are read plural times per timeslot.

13. The system in claim 12, further comprising:

a single control memory addressably selecting and reading out a number of individual bits equal to the plural read times per timeslot from the data memories in the column matrix.

14. The system in claim 12, wherein one or more data memories in the column matrix data memories are written plural times per timeslot.

15. The system in claim 12, further comprising:

a demultiplexer for combining individual bits generated by the selector during the plural read operations into an 8-bit time slot.

16. The system in claim 15, further comprising:

plural multiplexers corresponding to a number of the data memories in the column matrix less than a number of input sources of the timeslot data, wherein the plural multiplexers are used to write timeslot data from ones of the input sources plural times per timeslot.

17. In a switching system that uses a normal rate switch to switch time-slotted channels at a first rate and a subrate switch connected to the first rate switch to switch one or more bits in time-slotted channels at one of plural second rates slower than the first rate, the subrate switch, comprising:

a column matrix of data memories for storing timeslots having subrate data received from the normal rate switch, and a selector for selecting a timeslot in the data memories and an individual bit in the selected timeslot to permit selective switching of one or more individual bits through the subrate switch including a single control memory corresponding to the column matrix of data memories addressably selecting individual bits of the selected timeslot from the data memories in the column matrix.

18. The system in claim 17, wherein each data memory is a random access memory for storing a frame of timeslots and the selector further includes a first multiplexer controlled by the single control memory for selecting a timeslot from one of the data memories in the column matrix and a second multiplexer controlled by the single control memory for selecting an individual bit from that selected timeslot.

19. The system in claim 17, wherein there are plural column matrices, each column matrix corresponding to a single bit included in an output time slot, and wherein there is a corresponding single control memory for each column matrix.

20. The system in claim 17, wherein the data memories of the column matrix are read plural times per time slot.

21. The system in claim 17, wherein one or more data memories in the column matrix of data memories are written plural times per timeslot.

22. The system in claim 17, further comprising:

a demultiplexer for combining individual bits generated by the selector during the plural read operations into an 8-bit time slot.

23. The system in claim 22, further comprising:

plural multiplexers corresponding to a number of the data memories in the column matrix less than a number of input sources of the timeslot data, wherein the plural multiplexers are used to write timeslot data from ones of the input sources plural times per timeslot.

24. In a switch for switching digital telephony channels having different data rates including a normal rate switch connected by multiple bidirectional switch ports to various incoming and outgoing digital telephone channels and a subrate switch connected to the normal rate switch including plural columns and rows of data memories for storing frames of input time slots, each column corresponding to a single bit in an output timeslot, a method for subrate switching a subrate channel received as part of a normal rate channel at an incoming port of the normal rate switch, comprising:

(a) routing a timeslot received at the incoming port of the normal rate switch over a normal rate path through the normal rate switch to an outgoing port of the normal rate switch and then over a first link connection to one of plural incoming ports of the subrate switch, each subrate switch incoming port corresponding to one of the rows of data memories;

(b) establishing a subrate switching path through the subrate switch between the incoming port of the subrate switch and an outgoing port of the subrate switch including:

selecting the row of the data memories corresponding to the one incoming port of the subrate switch, addressing the time slot in each of the data memories in the selected row, and selecting one or more of the column memories in the selected row;

(c) routing the subrate channel over the subrate switching path; and (d) routing the subrate channel along with one or more other subrate channels as a new normal rate channel from the outgoing port of the subrate switch to another incoming port of the normal rate switch over a second link connection and then through the normal rate switch to another outgoing port of the normal rate switch.

25. The method of claim 24, wherein the first and second switched connections in the normal rate switch are semi-permanent connections.

26. The method of claim 24, wherein the first and second switched connections in the normal rate switch are established on-demand for a first call.

27. The method of claim 26, wherein one of the first and second switched connections in the normal rate switch established for the first call is maintained for a subsequent second call.

* * * * *